United States Patent
Klatt

(10) Patent No.: US 12,185,216 B2
(45) Date of Patent: Dec. 31, 2024

(54) ROUTING OF DATA PACKETS, AMONG A PLURALITY OF NETWORK NODES OF A TELECOMMUNICATIONS NETWORK, WHILE TAKING INTO ACCOUNT ENERGY INTENSITY

(71) Applicant: Deutsche Telekom AG, Bonn (DE)

(72) Inventor: Axel Klatt, Cologne (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 18/568,301

(22) PCT Filed: Jun. 2, 2022

(86) PCT No.: PCT/EP2022/065088
§ 371 (c)(1),
(2) Date: Dec. 8, 2023

(87) PCT Pub. No.: WO2022/263194
PCT Pub. Date: Dec. 22, 2022

(65) Prior Publication Data
US 2024/0267824 A1     Aug. 8, 2024

(30) Foreign Application Priority Data
Jun. 18, 2021   (EP) .................................. 21180323

(51) Int. Cl.
*H04W 40/08*     (2009.01)
(52) U.S. Cl.
CPC .................................. *H04W 40/08* (2013.01)

(58) Field of Classification Search
None
See application file for complete search history.

(56) References Cited

U.S. PATENT DOCUMENTS

| 11,743,170 B2 * | 8/2023 | Estabrooks ........... H04L 45/123 370/410 |
| 2008/0075007 A1 | 3/2008 | Mehta et al. |

(Continued)

FOREIGN PATENT DOCUMENTS

EP     2323440 A1     5/2011

OTHER PUBLICATIONS

Mukherjee S et al: "Connectivity, power and energy in a multihop cellular packet system", Vehicular Technology Conference, 2005, VTC-2005-Fall, 2005 IEEE 62nd Dallas, TX, USA Sep. 25-28, 2005, Piscataway, NJ, USA, IEEE, vol. 3, Sep. 25, 2005 (Sep. 25, 2005), pp. 1702-1707, XP010878795.

*Primary Examiner* — Brian S Roberts
(74) *Attorney, Agent, or Firm* — LEYDIG, VOIT & MAYER, LTD.

(57) ABSTRACT

A method for routing of data packets includes: in a first step, energy budget indication information is associated or applied to at least one specific data packet, wherein energy budget indication information or its information content is related to the energy intensity of the transmission of the at least one specific data packet; and in a second step, subsequent to the first step, a routing and/or scheduling decision regarding a next hop is taken by a specific preceding network node in dependency on the energy budget indication information or its information content, indicating available and/or residual energy budget.

10 Claims, 1 Drawing Sheet

(56) References Cited

U.S. PATENT DOCUMENTS

2011/0116402 A1* 5/2011 Kimura ................ H04W 40/08
370/252
2013/0223229 A1* 8/2013 Hui ...................... H04W 40/02
370/238

* cited by examiner

ROUTING OF DATA PACKETS, AMONG A PLURALITY OF NETWORK NODES OF A TELECOMMUNICATIONS NETWORK, WHILE TAKING INTO ACCOUNT ENERGY INTENSITY

CROSS-REFERENCE TO PRIOR APPLICATIONS

This application is a U.S. National Phase application under 35 U.S.C. § 371 of International Application No. PCT/EP2022/065088, filed on Jun. 2, 2022, and claims benefit to European Patent Application No. EP 21180323.4, filed on Jun. 18, 2021. The International Application was published in English on Dec. 22, 2022 as WO 2022/263194 A1 under PCT Article 21(2).

FIELD

The present invention relates inter alia to a method for the routing of data packets, among a plurality of network nodes of a telecommunications network, while taking into account energy intensity regarding the transmission of such data packets, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein, regarding a specific transmission hop, the transmission of the at least one specific data packet from a specific preceding network node to a specific subsequent network node requires the at least one specific data packet to be routed or scheduled.

Additionally, the present invention relates to a telecommunications network or network node for the routing of data packets, among a plurality of network nodes of the telecommunications network, while taking into account energy intensity regarding the transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein, regarding a specific transmission hop, the transmission of the at least one specific data packet from a specific preceding network node to a specific subsequent network node requires the at least one specific data packet to be routed or scheduled.

Furthermore, the present invention relates to a program comprising a computer readable program code, and to a computer-readable medium for using a network node according to an embodiment of the present invention or a telecommunications network according to an embodiment of the present invention.

BACKGROUND

The energy consumption in cellular networks, especially in new systems like 5G, is comparatively high. Due to the Shannon-Hartley-Theorem, a certain minimum amount of energy per transmitted bit is and will always be necessary for realizing any (reliable) data transmission over a wireless transmission channel. Hence, as part of the global responsibility of companies and industries to meet $CO_2$ reduction targets, a new approach is needed. This is especially the case for multi-hop wireless network topologies where different (transmission) paths may exist, and, on each path, different configurations/transmission schemes are able to be employed for the routing of data packets from a source to a destination node.

SUMMARY

In an exemplary embodiment, the present invention provides a method for routing of data packets, among a plurality of network nodes of a telecommunications network, while taking into account energy intensity regarding transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein, regarding a specific transmission hop, the transmission of the at least one specific data packet from a specific preceding network node to a specific subsequent network node requires the at least one specific data packet to be routed. The method comprises the following steps: in a first step, energy budget indication information is associated or applied to the at least one specific data packet, wherein the energy budget indication information or its information content is related to the energy intensity of the transmission of the at least one specific data packet, wherein the energy budget indication information comprises an energy-related indication comprising at least one of the following: information indicative of a total energy budget associated to the at least one specific data packet, information indicative of an energy budget taken by or associated to the considered transmission hop, information indicative of a remaining energy budget after the considered transmission hop, or information indicative of an energy budget per hop after the considered transmission hop; and in a second step, subsequent to the first step, a routing and/or scheduling decision regarding a next hop is taken by the specific preceding network node in dependency on the energy budget indication information or its information content, indicating available and/or residual energy budget, wherein the transmission of the at least one specific data packet is performed by the specific preceding network node. The transmission of the at least one specific data packet from the specific preceding network node to the specific subsequent network node requires the at least one specific data packet to be routed by a router entity or functionality or scheduled by a scheduler entity or functionality, wherein the router entity or functionality and/or the scheduler entity or functionality is or are part of or associated to the specific preceding network node.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
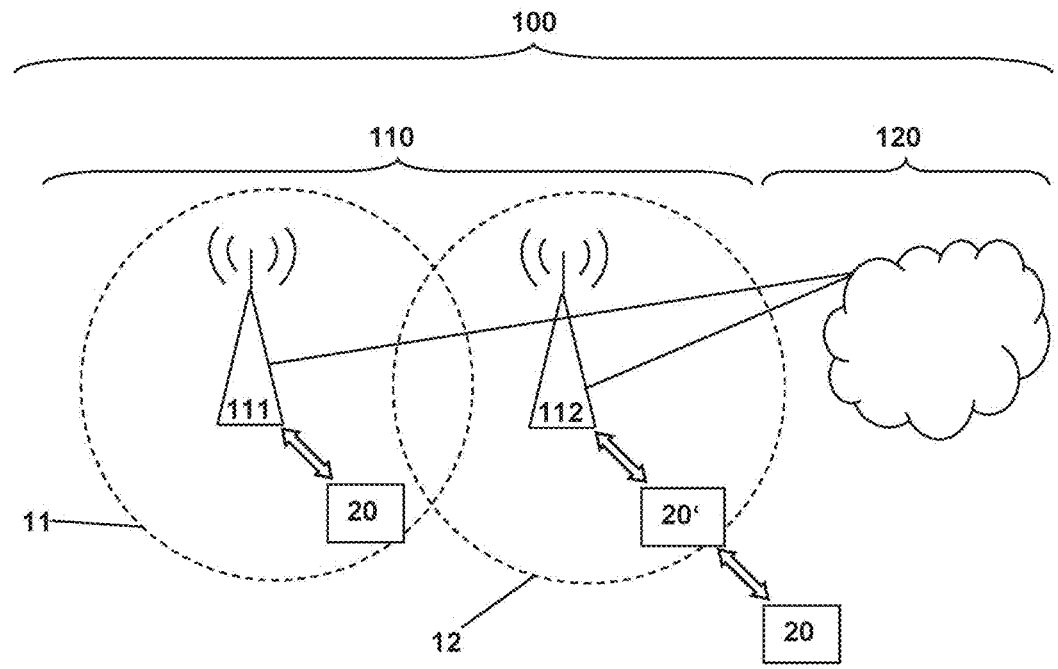
FIG. 1 schematically illustrates a mobile communication network comprising a multitude of radio cells being served by a multitude of base station entities, and a user equipment being served by the mobile communication network, either directly by a base station entity, or indirectly via an JAB node or a relay node.

The present invention provides a method for the routing of data packets, among a plurality of network nodes of a telecommunications network, while taking into account energy intensity regarding the transmission of such data packets, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein via using, by the telecommunications network, an energy budget indication, the transmission of data packets is able to be performed in a manner dependent on the energy budget information or its information content, hence requiring less amounts of energy, resulting in a reduced overall consumption of energy involved in realizing such data transmission, especially wireless data transmission.

Exemplary embodiments of the present invention provide a method for the routing of data packets, among a plurality of network nodes of a telecommunications network, while taking into account energy intensity regarding the transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein, regarding a specific transmission hop, the transmission of the at least one specific data packet from a specific preceding network node to a specific subsequent network node requires the at least one specific data packet to be routed or scheduled, wherein the method comprises the following steps:

in a first step, an energy budget indication information is associated or applied to the at least one specific data packet, wherein the energy budget indication information or its information content is related to the energy intensity of the transmission of the at least one specific data packet, in a second step, subsequent to the first step, the transmission of the at least one specific data packet is performed, by the specific preceding network node, dependent on the energy budget indication information or its information content.

According to the present invention, via using the energy budget indication information, it is advantageously possible to specifically inform the transmission of data packets—and specifically the transmission of data packets over or involving wireless transmission hops, especially more than one wireless transmission hop—using the energy budget indication information, and thereby be able to modify (with a granularity potentially up to the individual data packet) the transmission of data packets depending on the energy budget indication information associated or applied to the at least one specific data packet, or to the (specific) data packets of an entire data packet stream or flow. Hence, it is advantageously possible to take into consideration the energy consumption and/or the energy intensity and/or the delay (budget) associated or involved with an individual transmission hop, but alternatively or cumulatively also the energy consumption or the energy intensity of the succession of transmissions hops (i.e. especially all the transmission hops) between the source network node and the destination network node (i.e. the energy consumption or the energy intensity or the delay (budget) (for transmitting the specific data packet or the specific data packets) along the routing path of the specific data packet or of the specific data packets of an entire data packet stream or flow. Hence, it is also advantageously possible according to the present invention to, later on (i.e. after a transmission of a specific data packet (or a specific stream or flow of data packets) has occurred), compare the energy consumption and/or the energy intensity of different routing paths (e.g. in case of identical or comparable data packets to be transmitted) and to be able to consider, in scheduling and/or routing decisions, likely or expected energy consumptions or energy intensity levels of different routing path decisions and/or scheduling decisions.

Especially, it is advantageously possible, according to the present invention, that on the different hops or transmission hops (especially informed by or in dependence on the available and/or residual energy budget and/or delay budget) either different network nodes are able to be used and/or different radio configurations or radio transmission schemes or radio access technologies are able to be used, wherein, especially, a different energy consumption is or can be associated to either the use of the different network nodes and/or to the use of the different radio configurations or radio transmission schemes or radio access technologies.

The energy consumption in mobile communication networks or cellular networks, especially in new systems like 5G, is already comparatively high and a new trend to develop and deploy multi-hop and meshed networks as part of the communication infrastructure, e.g. evolving with and as part of 5G, is likely to even further contribute to this trend. Hence, especially as part of the global responsibility to meet $CO_2$ reduction targets, a new approach to also consider the amount of energy consumed for the delivery of a data packet over a wireless communication system is required. In case that the transmission of a (specific) data packet (or a specific stream or flow of data packets) using multi-hop and/or meshed networks (i.e. often (but not necessarily) using more than one wireless data transmission between network nodes) is concerned, there are typically different alternative routes (or routing alternatives) along which such a data transmission is able to be performed and/or there are different scheduling schemes that are possible to be used.

In conventionally known telecommunications networks, while the high-level topic of the importance of energy consumption is known as such, the implemented wireless, especially cellular, standards overwhelmingly used today, like LTE or 5G, do not provide a specific solution or implementation that specifically also takes into account— besides other considerations—the amount of energy (or the energy intensity of the considered data transmission) used to transmit a specifically considered amount of data, or a specifically considered connection or data flow on a fine-granular level.

Any data transmission over a wireless channel requires a minimum amount of energy per bit transmitted, this principle having been outlined by Claude Shannon and Ralph Hartley in the Shannon-Hartley-Theorem, stating that $E_b/N_0 > \ln 2$, i.e. the transmission of a certain number of bits requires a minimum amount of energy ($E_b$), and, in turn, the faster the transmission of data over a non-ideal channel is, the more energy will be required (or the higher the amount of transferred data, the higher the energy consumption). This also holds for multi-hop wireless network topologies where different paths (or routes or scheduling schemes) are possible and on each path different configurations/transmission schemes, etc. are able to be employed for the routing of data packets from a source to a destination node.

In conventionally known cellular communication systems, in order to route data packets through a wireless communication system from a source network node (e.g. a server in the internet) to a destination network node (e.g. a user equipment or a device), the classical transmission chain includes the core network (especially including a number routers to which the present invention is also able to be applied) and different radio nodes which may have different radio transmission technologies like GSM, UMTS, LTE, NR or WiFi. With such a system arrangement the radio access network typically includes only one RAN node or base station entity (e.g. an eNodeB (eNB) or gNodeB (gNB)), and the air-interface towards the user equipment.

According to current trends in cellular technology evolution, JAB (integrated access and backhaul) nodes are able to be used. Such network nodes are nodes providing a wireless connection to an eNB/gNB on the one side, and an access link to the user equipment on the other side. Also relay type of nodes aim to provide a RAN (radio access network) system with wireless connection to an eNB/gNB on the one side and the wireless access link to the user equipment on the other side. Currently, only one hop via an JAB or relay node to a user equipment (i.e. two transmission hops relying on a wireless transmission or the use of an air interface: one between a radio access network node or base station entity (RAN node, eNB or gNB, typically connected via a wireline or a quasi-wireline connection, e.g. a directional radio or free-space optical communication link) and the JAB or relay node, and one between the user equipment and the JAB or relay node) is typically employed. This already provides for an increase in possible alternative routes between network nodes. However, in the future also more than two such transmission hops (i.e. involving two or more JAB or relay nodes), relying on a wireless transmission or the use of an air interface, may be more widely used, resulting in an even larger number of possible different alternative transmission routes (or routing alternatives) from the source network node to the destination network node. Hence, according to the present invention, there are advantageously and preferably at least two wireless transmission hops between the source network node and the destination network node.

According to the present invention, it is advantageously possible—regarding the transmission of a (specific) data packet (or a specific stream or flow of data packets) using multi-hop and/or meshed networks (i.e. typically using more than one wireless data transmission between network nodes)—to prefer or to choose among different alternative (possible) routes (or routing alternatives) along which such a data transmission is able to be performed in a manner dependent on different parameters such as, e.g., an indication (or information content) of the energy budget indication information according to which a delay budget and/or an energy budget is already consumed or taken according to a predefined level, or based on an estimation or projection (especially based on previously performed data transmissions) regarding the energy consumption associated with a data transmission via one or another transmission path.

Typically, the telecommunications network comprises or is assigned to a core network and the telecommunications network comprises or is assigned to an access network comprising a plurality of base station entities, and the user equipment is connected to either a specific base station entity of the plurality of base station entities (of the access network) or via one or a plurality of JAB or relay network nodes. Typically, at least one data stream (or data flow) is transported between the source network node and the destination network node. The energy budget indication information is preferably associated or applied to each data packet specifically; however, it may also be associated or applied to a data stream or data flow.

In order to be able to efficiently and effectively take routing and/or scheduling decisions regarding data packets and/or data streams or data flows, it is advantageously possible, according to the present invention, to take the energy intensity of such data transmissions between the source network node and the destination network node (typically a user equipment) into consideration (or to be able to be taken into consideration) on a comparatively fine grained level. Hence, in a first step, according to the present invention, an energy budget indication information is associated or applied to the at least one specific data packet, wherein the energy budget indication information or its information content is related to the energy intensity of the transmission of the at least one specific data packet, and in a second step, subsequent to the first step, the transmission of the at least one specific data packet is performed, by the specific preceding network node, dependent on the energy budget indication information or its information content.

Hence, according to the present invention, the energy budget indication information is advantageously possible to be used to take the energy intensity of data transmissions into consideration on a comparatively fine-grained level, i.e. on the level of data packets or, alternatively, data streams or data flows.

According to a preferred embodiment of the present invention, the transmission of the at least one specific data packet from the specific preceding network node to the specific subsequent network node requires the at least one specific data packet to be
  routed by a router entity or functionality or
  scheduled by a scheduler entity or functionality,
wherein the router entity or functionality and/or the scheduler entity or functionality is or are part of or associated to the specific preceding network node.

Thereby, it is advantageously possible that the routing and/or scheduling decision is able to be appropriately taken by the router entity or functionality and/or the scheduler entity or functionality of or associated to the specific preceding network node.

According to a further preferred embodiment of the present invention, the transmission of the at least one specific data packet from the source network node to the destination network node alternatively involves a transmission from the specific preceding network node to a further specific subsequent network node of the telecommunications network, wherein in the second step, subsequent to the first step, the transmission of the at least one specific data packet is performed, by the specific preceding network node, to the further specific subsequent network node instead of to the specific subsequent network node dependent on the energy budget indication information or its information content, wherein especially the specific subsequent network node or the further specific subsequent network node serves as further specific preceding network node regarding a further or subsequent considered transmission hop of the at least one specific data packet.

It is furthermore preferred according to the present invention that the energy budget indication information or its content is specific to the considered transmission hop from the specific preceding network node to the specific subsequent network node or to the further specific subsequent network node, wherein especially a different further energy budget indication information or an energy budget indication information having a different content is specific to a further or subsequent considered transmission hop of the at least one specific data packet, especially from the specific subsequent network node or the further specific subsequent network node to a still further specific subsequent network node.

It is thereby advantageously possible to comparatively easily apply an embodiment of the present invention in a flexible manner.

According to still further preferred embodiments of the present invention, the energy budget indication information and/or the further energy budget indication information comprises, respectively, a delay-related indication, wherein the delay-related indication especially comprises at least one of the following:
- an information indicative of the total delay budget associated to the at least one specific data packet,
- an information indicative of the delay budget taken by or associated to the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used,
- an information indicative of the remaining delay budget after the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used,
- an information indicative of the delay budget per hop after the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used.

It is thereby advantageously possible to comparatively easily apply an embodiment of the present invention.

According to a further preferred embodiment of the present invention, the energy budget indication information and/or the further energy budget indication information comprises, respectively, an energy-related indication, wherein the energy-related indication especially comprises at least one of the following:
- an information indicative of the total energy budget associated to the at least one specific data packet,
- an information indicative of the energy budget taken by or associated to the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used,
- an information indicative of the remaining energy budget after the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used,
- an information indicative of the energy budget per hop after the considered transmission hop or the further or subsequent considered transmission hop, especially dependent on whether the specific subsequent network node or the further specific subsequent network node being involved in the transmission and/or especially dependent on whether a first radio configuration or radio transmission scheme or radio access technology is used or whether a second radio configuration or radio transmission scheme or radio access technology is used.

It is thereby advantageously possible to comparatively easily apply an embodiment of the present invention.

According to another preferred embodiment of the present invention, —after the at least one specific data packet being received by the destination network node—the respective resulting energy budget indication information is analyzed or fed back to the source network node or another network node of the telecommunications network, especially for optimization purposes, wherein especially the respective resulting energy budget indication information is indicative of:
- the energy budget taken by or associated to all transmission hops between the source network node and the destination network node and/or
- the remaining energy budget after all transmission hops have been performed between the source network node and the destination network node.

Thereby, it is advantageously possible according to the present invention that comparatively precise and meaningful estimates are able to be generated such that the likely energy consumption and/or the likely delay consumption is able to be assessed or estimated beforehand such as to be able to take sensible and realistic routing and/or scheduling decisions.

According to a further preferred embodiment of the present invention, the destination network node is a user equipment, wherein the final transmission hop towards the user equipment involves the user equipment as the subsequent network node, wherein the final transmission hop towards the user equipment
- involves either a base station entity or functionality as the preceding network node,
- or an integrated access and backhaul device or a relay device as the preceding network node.

According to still a further preferred embodiment of the present invention, both the source network node and the destination network node is a user equipment.

The present invention also relates to a telecommunications network or network node for the routing of data packets, among a plurality of network nodes of the telecommunications network, while taking into account energy intensity regarding the transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, wherein, regarding a specific transmission hop, the transmission of the at least one specific data packet from a specific preceding network node to a specific subsequent network node requires the at least one specific data packet to be routed or scheduled, wherein the telecommunications network or the network node is configured such that:
- an energy budget indication information is associated or applied to the at least one specific data packet, wherein the energy budget indication information or its information content is related to the energy intensity of the transmission of the at least one specific data packet,
- the transmission of the at least one specific data packet is performed, by the specific preceding network node, dependent on the energy budget indication information or its information content.

Thereby it is advantageously possible, that—also with respect to the telecommunications network or to the network node—the energy budget indication information is able to be used in order to appropriately take routing and/or scheduling decisions in order to be able to reduce the energy intensity related to data transmissions.

The present invention also relates to a network node configured to be used in a telecommunications network according to the present invention.

Thereby it is advantageously possible, that—also with respect to the network node
- the energy budget indication information is able to be used in order to appropriately take routing and/or scheduling decisions in order to be able to reduce the energy intensity related to data transmissions.

Furthermore, the present invention relates to a program comprising a computer readable program code which, when executed on a computer or on a network node of a telecommunications network causes the computer or the network node of the telecommunications network to perform a method according to an embodiment of the present invention.

The present invention also relates to a computer-readable medium comprising instructions which when executed on a computer or on a network node of a telecommunications network causes the computer or the network node of the telecommunications network to perform a method according to an embodiment of the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100 is schematically shown. In the example, the mobile communication network 100 comprises an access network 110 and a core network 120. The mobile communication network 100 is preferably a cellular telecommunications network comprising typically a plurality of network cells (or radio cells), wherein two radio cells are represented in FIG. 1 via reference signs 11 and 12: a first radio cell 11, and a second radio cell 12. The access network 110 comprises at least a first base station entity 111 serving the first radio cell 11, and a second base station entity 112, serving the second radio cell 12. A first example of a user equipment 20 is schematically depicted in FIG. 1 as an example of a user equipment in contact to the telecommunications network 100. The user equipment 20 is connected wirelessly (via one (wireless) hop or one (wireless) transmission hop) to one of the base station entities 111, 112, in the example shown to the first base station entity 111; this is schematically represented via a double arrow in FIG. 1 between the user equipment 20 and the first base station entity 111. A second example of a user equipment 20 is also schematically shown in FIG. 1 as an example of a user equipment in contact to the telecommunications network 100; however, the second example shows the user equipment 20 being wirelessly connected to the telecommunications network 100 via two (wireless) hops (or two (wireless) transmission hops) to, in the exemplary representation of FIG. 1, the second base station entity 112; this is schematically represented via a first double arrow in FIG. 1 between the second base station entity 112 and a IAB node 20' (or relay node 20'), and a second double arrow in FIG. 1 between the IAB node 20' (or relay node 20') and the user equipment 20. The user equipment 20 is depicted, in FIG. 1, as being located outside of the second radio cell 12 (i.e. outside of the radio coverage area of the second radio cell 12, i.e. the second base station entity 112, hence, the user equipment 20 is typically experiencing or receiving an insufficient signal strength of radio signals transmitted by the second base station entity 112); however, while this may actually be the case (at least temporarily), this relationship (of the user equipment 20 being located outside of the radio coverage area of the second base station entity 112) is not necessarily the case: the user equipment 20 may be (at least temporarily) inside of the radio coverage area of the second radio cell 12, despite being connected, to the second base station entity 112, via the JAB node 20' or relay node 20'. Furthermore, there may be more than two wireless hops or transmission hops between the user equipment 20 and a corresponding base station entity 111, 112, i.e. two or more JAB nodes or relay nodes (e.g. of the kind of JAB node 20' or relay node 20' or of another kind or different kinds) connect the user equipment 20 (via more than two wireless transmission hops) to the corresponding base station entity 111, 112.

Figure 2:
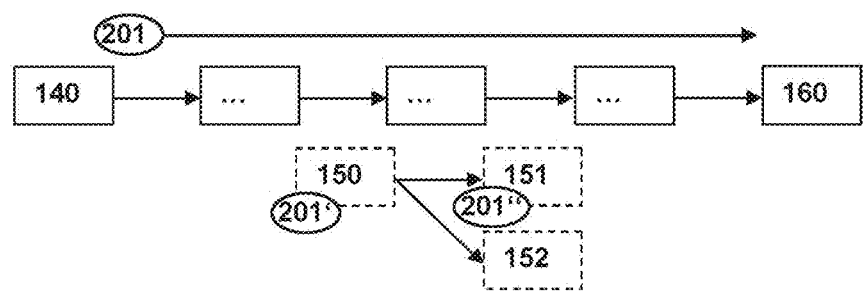
FIG. 2 schematically illustrates an example of a data transmission, i.e. the transmission of data packets, among a plurality of network nodes of the telecommunications network from a source network node to a destination network node.

Regarding such data transmissions between the telecommunications network 100 and the user equipment 20, the present invention provides a method (as well as a corresponding telecommunications network 100 and a corresponding network node) for the routing of data packets, among a plurality of network nodes of the telecommunications network 100 such that the energy intensity regarding the transmission of such data packets is taken into account. FIG. 2 schematically illustrates an example of a data transmission, i.e. the transmission of data packets, among a plurality of network nodes of the telecommunications network 100 from a source network node 140 to a destination network node 160. The data packet to be transmitted from the source network node 140 to the destination network node 160 is schematically indicated via an oval and reference sign 201. The data packet 201 is typically part of a data stream or data flow, i.e. as part of such a data stream or data flow, a plurality of similar data packets are to be transmitted, likewise from the source network node 140 to the destination network node 160. However, in FIG. 2, only one exemplary data packet 201 is schematically shown. In the context of the present invention, such a data packet 201 is also designated as a specific data packet 201, i.e. referring to the data packet that is considered. Often, the different data packets of a data stream or data flow are all treated more or less similarly, and are transmitted from the source network node 140 to the destination network node 160, via a certain number of intermediary network nodes (in FIG. 2, three intermediate network nodes are schematically shown); for the sake of simplicity, such intermediary network nodes are not designated, in FIG. 2, via separate reference signs. As the data packets (and, hence, each specific data packet) are transmitted (or is transmitted) from the source network node 140 to the destination network node 160, at least one hop or transmission hop needs to be traversed, i.e. the data packets or the specific data packet need(s) to be transmitted via or through the hop or transmission hop. Typically, there is not only one hop or transmission hop between the source network node 140 and the destination network node 160, but a plurality of such hops or transmission hops. Hence, the data packets or the specific data packet normally need(s) to traverse (besides the source and destination network node 140, 160) at least one intermediary network node but often more than one intermediary network nodes. Hence, on the transmission path of the data packets 201 or of the specific data packet 201, there are typically a certain number of hops or transmission hops and one or a plurality of intermediary network nodes.

Often or typically (but not necessarily), the destination network node 160 is or corresponds to a user equipment 20, wherein the final transmission hop towards the user equipment 20 involves the user equipment as the subsequent network node, wherein the final transmission hop towards the user equipment involves either a base station entity or functionality as the preceding network node, or an integrated access and backhaul device or a relay device as the preceding network node.

In the schematical representation of FIG. 2, three intermediary network nodes (resulting in four transmission hops) are schematically shown between source and destination network nodes 140, 160. Regarding each one of these hops or transmission hops, a preceding network node 150 and a subsequent network node 151 is able to be defined: At each hop or transmission hop, the data packet(s) or the specific data packet 201 needs to be transmitted from the preceding network node 150 to the subsequent network node 151, and this subsequent network node 151 becomes the preceding network node (or: further specific preceding network node) regarding the next hop (i.e. regarding the further or subsequent considered transmission hop of the at least one specific data packet 201)—unless this subsequent network node corresponds to the destination network node 160—, and likewise this preceding network node 150 is (or has been) the subsequent network node regarding the preceding hop—unless this preceding network node corresponds to the source network node 140. This is schematically illustrated, in FIG. 2, via a preceding network node 150 and a subsequent network node 151 being shown. In the context of the present invention, regarding the specific data packet 201, the preceding network node 150 (regarding a specific hop or transmission hop considered) is also called the specific preceding network node 150, and, likewise, the subsequent network node 151 (regarding the specific hop or transmission hop considered) is also called the specific subsequent network node 151. Furthermore, regarding at least some of the hops or transmission hops—and especially regarding the wireless transmission hops between a concerned base station entity 111, 112, and an IAB network node or relay network node 20'—there may be a choice whether to route the data packets or the specific data packet 201 rather via the specific subsequent network node 151, or instead via a different network node (hereinafter also called further specific subsequent network node 152, i.e. as an alternative route or routing path (alternative to the specific subsequent network node 151) to transmit the data packets (or data stream or data flow) or the specific data packet 201). This is schematically shown in FIG. 2 via two arrows originating from the specific preceding network node 150 and being directed to the specific subsequent network node 151, and to the further specific subsequent network node 152, respectively.

Hence, according to the present invention, the transmission of the specific data packet 201 involves a plurality of transmission hops between the respective preceding network node and the respective subsequent network node of the telecommunications network 100, and, regarding each specific transmission hop, the transmission of the at least one specific data packet 201 from the specific preceding network node 150 to the specific subsequent network node 151—or alternatively to the further specific subsequent network node 152, or to even a still further network node—requires the at least one specific data packet 201 to be routed and/or scheduled, i.e. a routing and/or scheduling decision is required.

According to the present invention, an energy budget indication information 201' is used or involved in this routing or scheduling decision: The energy budget indication information 201' is associated or applied to the at least one specific data packet 201, and the energy budget indication information 201' (or its information content) is related to the energy intensity of the transmission of the at least one specific data packet 201. Furthermore, the transmission of the at least one specific data packet 201 (regarding the considered specific transmission hop) is performed, by the specific preceding network node 150, dependent on the energy budget indication information 201' or its information content, i.e. the routing and/or scheduling decision is taken dependent especially on how much of the energy budget has already been consumed for the transmission up to this point, how much of the energy budget is likely to be needed for the transmission until the destination network node 160 (either the likely total of that energy budget or the likely portion still needed regarding that energy budget).

Furthermore, it is preferred according to the present invention that the transmission of the at least one specific data packet 201 from the specific preceding network node 150 to the specific subsequent network node 151 requires the at least one specific data packet 201 to be routed by a router entity or functionality and/or scheduled by a scheduler entity or functionality, wherein the router entity or functionality and/or the scheduler entity or functionality is or are part of or associated to the specific preceding network node 150. Thereby, the respective specific preceding network node is able to take the routing and/or scheduling decision, at least regarding the next hop, i.e. whether to transmit the data packet 201 either to the specific subsequent network node 151, or alternatively to the further specific subsequent network node 152. Furthermore, it is advantageously possible that—likewise depending on the energy budget indication information 201' or its information content—the scheduling entity or functionality decides about the transmission mode or about which radio access technology or which frequency band shall be used or applied for the transmission of the data packet 201 to either the specific subsequent network node 151, or alternatively the further specific subsequent network node 152.

According to the present invention, the energy budget indication information 201' or its information content may either be identical, quasi-identical or rather unchanged along the transmission path (or routing path) of the data packet 201 from the source to the destination node 140, 160. Such an alternative embodiment or usage scenario of the energy budget indication information may apply in case that the information content of the energy budget indication information, especially regarding the routing and/or scheduling decisions to be taken, is such that the routing path and/or the scheduling alternative to choose is rather straight forward; in such a scenario, each network node along the transmission or routing path may merely add or complement the energy budget indication information 201' or its information content, e.g. by the used energy for the respective transmission, but keep the (original, i.e. at, e.g., the source network node 140) energy budget indication information 201' or its information content rather unchanged. Alternatively to such an embodiment, the energy budget indication information 201' or its information content may be specific to the considered transmission hop from the specific preceding network node 150 to the specific subsequent network node 151 or to the further specific subsequent network node 152 (i.e. it may change along the transmission path (or routing path) of the data packet 201 from the source to the destination node 140, 160). Hence, a different further energy budget indication information 201" (or an energy budget indication information having a different information content being specific to a further or subsequent considered transmission hop of the at least one specific data packet 201) would be used as the corresponding energy budget indication information at the subsequent transmission hop (i.e. the subsequent network node).

According to the present invention, the energy budget indication information 201' (and/or the further energy budget indication information 201") comprises a delay-related indication and/or an energy-related indication.

The delay-related indication especially comprises at least one of the following:
- an information indicative of the total delay budget associated to the at least one specific data packet 201,
- an information indicative of the delay budget taken by or associated to the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used,
- an information indicative of the remaining delay budget after the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used,
- an information indicative of the delay budget per hop after the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used.

The energy-related indication especially comprises at least one of the following:
- an information indicative of the total energy budget associated to the at least one specific data packet 201,
- an information indicative of the energy budget taken by or associated to the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used,
- an information indicative of the remaining energy budget after the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used, an information indicative of the energy budget per hop after the considered transmission hop or the further or subsequent considered transmission hop, especially dependent on whether the specific subsequent network node 151 or the further specific subsequent network node 152 being involved in the transmission and/or especially dependent on whether a first radio configuration or radio transmission scheme or radio access technology is used or whether a second radio configuration or radio transmission scheme or radio access technology is used.

It is known that different radio access technologies radio configurations and/or radio signal transmission schemes either involve a comparatively low or lower energy intensity (according to different measures to be discussed in greater detail), or otherwise involve a comparatively high or higher energy intensity—or are able to be ranked for their energy intensity. Typically, radio access technologies and/or radio configurations and/or radio signal transmission schemes involving a lower energy intensity are less performant regarding usual quality-of-service criteria such as bandwidth, latency, error rate and the like, and vice versa, i.e. radio access technologies and/or radio configurations and/or radio signal transmission schemes involving a higher energy intensity are typically more performant regarding such usual quality-of-service criteria. Via selecting or adapting the radio access technologies and/or the radio configuration and/or the radio signal transmission schemes used for the different transmission hops, it is advantageously possible, according to the present invention, that especially a corresponding routing and/or scheduling decision is able to modify the energy intensity regarding the transmission of the specific data packet and/or the corresponding data stream or flow.

A specific focus according to the present invention is to implement procedures and methods according to embodiments of the present invention via protocol extension for 4G/5G/6G cellular systems being defined by 3GPP; however, this does not exclude to apply the same or corresponding principles and related signaling also for non-3GPP accesses, such as, e.g., WiFi being defined by IEEE 802.11.

In the future, the focus may shift from ultra-high data rates with extremely low latencies to a more (environmentally) sustainable wireless communication, taking also into account the energy intensity of the different radio access technologies and/or radio schemes involved or (predominantly) used, and especially including the growing field of multi-hop wireless networks.

Especially, the present invention refers to 'multi hop' (also called "multi-ho") configuration, i.e. involving JAB network nodes or devices or relay nodes, i.e. especially user equipments that are able to establish communication links between themselves (e.g. using the NR sidelink functionality) or Integrated-Access and Backhaul (IAB) nodes or Relays of Layer 2 or Layer 3 type. The present invention also encompasses to use many such wireless JAB or relay nodes and the possibilities to route data packets through such a system are multifold.

As there are multiple ways to transfer a (specific) data packet 201 with often very different energy consumption depending on the chosen radio transmission technology and/or radio configuration, but also based on the route the (specific) data packet 201 takes through the wireless system, the present invention utilizes the energy budget indication information 201' (about the "Energy Budget" for the data packet) as part of the scheduling algorithm in a radio access network function ("scheduler") or the routing decision function of involved network nodes.

In principle, there is the need to get this information known at the each involved network node (core network servers, routers, radio access network eBN/gNB, JAB nodes, Relays, routing user equipments, . . . ) to utilize it in scheduling and/or routing decisions (i.e., e.g., should the data packet be sent fast on the shortest route using high energy consumption, because the delay budget is already taken to x % or is there still room for a slower/longer route but more energy friendly data transmission configuration).

By applying such a scheduling or routing decision, the energy consumption for the transmission of each individual packet can be optimized and thus the overall energy consumption, minimized for the cellular system.

The energy budget indication information 201' according to the present invention may be an "Energy Budget" (e.g. varying from 0 to 100%), where each network node (along a transmission path) that transfers the data packet would take a defined portion of the energy budget for its own transmission or routing decision and the remaining portion would be used and signaled to the next network node.

According to the present invention, it is furthermore advantageously possible and preferred to use a dynamic self-leaning (Machine Learning "ML" or Artificial Intelligence "AI")-based approach for the optimization of the energy budget dependent scheduling and/or routing: In this case a feedback loop is provided for signaling back the remaining resulting energy budget (and/or delay budget) once the data packet 201 has arrived at the destination network node 160. This self-learning feedback loop can also use similar signaling approaches based on the currently used control plane signaling defined in 3GPP or any kind of newer internet based protocols or signaling formats like XML, .json, etc.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for routing of data packets, among a plurality of network nodes of a telecommunications network, while taking into account energy intensity regarding transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, and wherein the method comprises the following steps:

in a first step, energy budget indication information is associated or applied to the at least one specific data packet, wherein the energy budget indication information or its information content is related to the energy intensity of the transmission of the at least one specific data packet, wherein the energy budget indication information comprises an energy-related indication comprising at least one of the following:

information indicative of a total energy budget associated to the at least one specific data packet, information indicative of an energy budget taken by or associated to a considered transmission hop, information indicative of a remaining energy budget after the considered transmission hop, or information indicative of the energy budget per hop after the considered transmission hop; and in a second step, subsequent to the first step, a routing and/or scheduling decision regarding a next hop is taken by a specific preceding network node in dependency on the energy budget indication information or its information content, wherein the transmission of the at least one specific data packet is performed by the specific preceding network node, wherein the transmission of the at least one specific data packet from the specific preceding network node to a specific subsequent network node is based on the at least one specific data packet being routed by a router entity or functionality or scheduled by a scheduler entity or functionality;

wherein the router entity or functionality and/or the scheduler entity or functionality is or are part of or associated to the specific preceding network node.

2. The method according to claim 1, wherein the transmission of another specific data packet from the source network node to the destination network node involves a transmission from the specific preceding network node to a further specific subsequent network node of the telecommunications network, wherein in a respective second step, subsequent to a respective first step, the transmission of the at least one specific data packet is performed, by the specific preceding network node, to the further specific subsequent network node instead of to the specific subsequent network node dependent on further energy budget indication information or its information content.

3. The method according to claim 1, wherein the energy budget indication information or its content is specific to the considered transmission hop from the specific preceding network node to the specific subsequent network node.

4. The method according to claim 1, wherein the energy budget indication information comprises a delay-related indication, wherein the delay-related indication comprises at least one of the following:

information indicative of a total delay budget associated to the at least one specific data packet, information indicative of a delay budget taken by or associated to the considered transmission hop, information indicative of a remaining delay budget after the considered transmission hop, or information indicative of the delay budget per hop after the considered transmission hop.

5. The method according to claim 1, wherein the energy-related indication further comprises at least one of the following:

information indicative of an energy budget taken by or associated to a further or subsequent considered transmission hop, information indicative of a remaining energy budget after the further or subsequent considered transmission hop, or information indicative of an energy budget per hop after the further or subsequent considered transmission hop.

6. The method according to claim 1, wherein the energy budget taken by or associated to the considered transmission hop, the remaining energy budget after the considered transmission hop, and/or the energy budget per hop after the considered transmission hop, is or are dependent on whether a first radio configuration or radio transmission scheme or radio access technology is used or whether a second radio configuration or radio transmission scheme or radio access technology is used.

7. The method according to claim 1, wherein—after the at least one specific data packet is received by the destination network node resulting energy budget indication information is analyzed or fed back to the source network node or another network node of the telecommunications network, wherein the resulting energy budget indication information is indicative of:

an energy budget taken by or associated to all transmission hops between the source network node and the destination network node, and/or a remaining energy budget after all transmission hops have been performed between the source network node and the destination network node.

8. The method according to claim 1, wherein the destination network node is a user equipment, wherein the final transmission hop towards the user equipment involves the user equipment as the subsequent network node, and wherein the final transmission hop towards the user equipment involves either:

a base station entity or functionality as the preceding network node, or an integrated access and backhaul device or a relay device as the preceding network node.

9. One or more non-transitory computer-readable mediums having processor-executable instructions stored thereon for routing of data packets, among a plurality of network nodes of a telecommunications network, while taking into account energy intensity regarding transmission of such data packets among the plurality of network nodes, wherein at least one specific data packet is transmitted from a source network node of the telecommunications network to a destination network node of the telecommunications network, wherein this transmission involves a plurality of transmission hops between a preceding network node and a subsequent network node of the telecommunications network, respectively, and wherein the processor-executable instructions, when executed, facilitate performance of the following steps:

in a first step, energy budget indication information is associated or applied to the at least one specific data packet, wherein the energy budget indication information or its information content is related to the energy intensity of the transmission of the at least one specific data packet, wherein the energy budget indication information comprises an energy-related indication comprising at least one of the following:

information indicative of a total energy budget associated to the at least one specific data packet, information indicative of an energy budget taken by or associated to a considered transmission hop, information indicative of a remaining energy budget after the considered transmission hop, or information indicative of the energy budget per hop after the considered transmission hop; and in a second step, subsequent to the first step, a routing and/or scheduling decision regarding a next hop is taken by a specific preceding network node in dependency on the energy budget indication information or its information content, wherein the transmission of the at least one specific data packet is performed by the specific preceding network node, wherein the transmission of the at least one specific data packet from the specific preceding network node to a specific subsequent network node is based on the at least one specific data packet being routed by a router entity or functionality or scheduled by a scheduler entity or functionality;

wherein the router entity or functionality and/or the scheduler entity or functionality is or are part of or associated to the specific preceding network node.

10. A telecommunications system for routing of data packets while taking into account energy intensity regarding transmission of such data packets, comprising:

a plurality of network nodes of a telecommunications network, including a source network node and a destination network node;

wherein the source network node is configured to transmit at least one specific data packet to the destination network node;

wherein this transmission involves a plurality of transmission hops between a preceding network node and a subsequent network node of the telecommunications network, respectively;

wherein energy budget indication information is associated or applied to the at least one specific data packet, wherein the energy budget indication information or its information content is related to the energy intensity of the transmission of the at least one specific data packet, wherein the energy budget indication information comprises an energy-related indication comprising at least one of the following:

information indicative of a total energy budget associated to the at least one specific data packet, information indicative of an energy budget taken by or associated to a considered transmission hop, information indicative of a remaining energy budget after the considered transmission hop, or information indicative of the energy budget per hop after the considered transmission hop; and wherein a specific preceding network node of the plurality of network nodes is configured to take a routing and/or scheduling decision regarding a next hop in dependency on the energy budget indication information or its information content;

wherein the specific preceding network node is configured to transmit the at least one specific data packet to a specific subsequent network node of the plurality of network nodes based on the at least one specific data packet being routed by a router entity or functionality or scheduled by a scheduler entity or functionality;

wherein the router entity or functionality and/or the scheduler entity or functionality is or are part of or associated to the specific preceding network node.

\* \* \* \* \*